US008831867B2

(12) United States Patent
Bald et al.

(10) Patent No.: US 8,831,867 B2
(45) Date of Patent: Sep. 9, 2014

(54) DEVICE AND METHOD FOR DRIVER ASSISTANCE

(75) Inventors: Heiko Bald, Modautal (DE); Aiko Boehme, Ingelheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/450,545

(22) Filed: Apr. 19, 2012

(65) Prior Publication Data

US 2012/0271539 A1  Oct. 25, 2012

(30) Foreign Application Priority Data

Apr. 19, 2011  (DE) .......................... 10 2011 018 159

(51) Int. Cl.
*G05D 1/02* (2006.01)
*G06F 17/10* (2006.01)
*G06G 7/78* (2006.01)
*G06F 17/00* (2006.01)
*G08G 1/0965* (2006.01)

(52) U.S. Cl.
CPC .............. *G06F 17/00* (2013.01); *G08G 1/0965* (2013.01)
USPC ...................................................... 701/300

(58) Field of Classification Search
CPC ....... G06F 17/00; G08G 1/0965; G08G 1/167
USPC .................................................. 701/1, 300
See application file for complete search history.

(56) References Cited

U.S. PATENT DOCUMENTS

| 3,854,119 | A | * | 12/1974 | Friedman et al. | 340/902 |
| 3,876,940 | A | * | 4/1975 | Wickord et al. | 455/341 |
| 5,289,181 | A | * | 2/1994 | Watanabe et al. | 340/902 |
| 5,495,243 | A | * | 2/1996 | McKenna | 340/902 |
| 5,739,767 | A | * | 4/1998 | Carr | 340/902 |
| 6,011,492 | A | * | 1/2000 | Garesche | 340/904 |
| 6,252,520 | B1 | * | 6/2001 | Asami et al. | 340/903 |
| 6,388,565 | B1 | | 5/2002 | Bernhard et al. | |
| 7,617,037 | B2 | | 11/2009 | Desens et al. | |

(Continued)

FOREIGN PATENT DOCUMENTS

| DE | 19921449 C1 | 1/2001 |
| DE | 10159658 A1 | 6/2003 |

(Continued)

OTHER PUBLICATIONS

German Patent Office, German Search Report dated Feb. 8, 2012 for German Application No. 102011018159.8.

*Primary Examiner* — Mary Cheung
*Assistant Examiner* — Frederick Brushaber
(74) *Attorney, Agent, or Firm* — Ingrassia Fisher & Lorenz, P.C.

(57) ABSTRACT

A driver assistance device for a motor vehicle is provided. The driver assistance device includes an environmental sensor configured for monitoring a monitoring space located laterally to the motor vehicle for the presence of an object. An analysis unit is configured to receive a detection signal from the environmental sensor for estimating a possible endangerment of the motor vehicle by the object present in the monitoring space and to deliver a result signal representative of the endangerment. The analysis unit is configured to judge on the basis of the detection signal whether the object present in the monitoring space is approaching a lane adjacent to a lane traveled by the motor vehicle and to signal a result of a judgment in the result signal.

15 Claims, 2 Drawing Sheets

(56) References Cited

U.S. PATENT DOCUMENTS

| | | | |
|---|---|---|---|
| 8,346,437 B2 * | 1/2013 | Hayakawa et al. | 701/42 |
| 2005/0015203 A1 * | 1/2005 | Nishira | 701/301 |
| 2005/0216171 A1 * | 9/2005 | Heinrichs-Bartscher | 701/96 |
| 2008/0125972 A1 * | 5/2008 | Neff | 701/300 |
| 2008/0291000 A1 | 11/2008 | Kim et al. | |
| 2010/0030430 A1 * | 2/2010 | Hayakawa et al. | 701/42 |
| 2010/0318263 A1 * | 12/2010 | Hayakawa et al. | 701/41 |

FOREIGN PATENT DOCUMENTS

| | | |
|---|---|---|
| DE | 10310501 A1 | 9/2004 |
| DE | 102007046688 A1 | 4/2009 |
| EP | 1312506 A2 | 5/2003 |
| GB | 2350741 A | 12/2000 |

\* cited by examiner

DEVICE AND METHOD FOR DRIVER ASSISTANCE

CROSS-REFERENCE TO RELATED APPLICATION

This application claims priority to German Patent Application No. 10 2011 018 159.8, filed Apr. 19, 2011, which is incorporated herein by reference in its entirety.

TECHNICAL FIELD

The technical field generally relates to a device and method for assisting a driver of a motor vehicle when changing between lanes of a multilane road.

BACKGROUND

A driver assistance device for a motor vehicle that monitors a lane adjacent to the lane traveled by the motor vehicle for the presence of other vehicles and outputs a warning signal to the driver of the motor vehicle if a change to this adjacent lane would result in a conflict with a vehicle already located on the lane is known, e.g., from DE 199 21 449 C1. This known driver assistance device monitors a so-called blind spot section, i.e., a region located laterally behind the vehicle carrying the driver assistance device. This blind spot section typically can only be monitored with difficulty by the driver of the vehicle by means of rearview mirrors and vehicles approaching from the rear can easily be overlooked.

This typical driver assistance device cannot respond to a vehicle that moves in parallel to the vehicle carrying the driver assistance device to the lane adjacent to the neighboring lane, because otherwise the driver would also refrain from a change to the closest adjacent lane when this lane is actually free.

A hazardous situation that typical lane change driver assistance devices are not capable of catching occurs if two vehicles attempt to merge from different directions onto a lane located between them. Such a situation can occur in particular if, as schematically shown in FIG. 1, a first motor vehicle 1 on a passing lane 4 of a freeway passes a motor vehicle 2 moving on the right lane 5 at the level of an entry 6 and simultaneously a third motor vehicle 3 attempts to reach the right lane 5 from the entry 6. In particular if the second vehicle 2 is a truck, the driver of the motor vehicle 1 generally cannot see the traffic on the entry 6 while he passes the truck 2, and the driver of the vehicle 3 also has no possibility of seeing the vehicle 1 before it has passed the truck 2. Therefore, if both other vehicles only pay attention to the truck 2 while merging, an accident can easily occur.

It is at least one object to provide means that help the driver of a motor vehicle to avoid such a hazardous situation. In addition, other objects, desirable features and characteristics will become apparent from the subsequent summary and detailed description, and the appended claims, taken in conjunction with the accompanying drawings and this background.

SUMMARY

A driver assistance device for a motor vehicle is provided. The driver assistance device has an environmental sensor for monitoring a monitoring space extending laterally from the motor vehicle for the presence of an object therein. The driver assistance device also includes an analysis unit receiving a detection signal of the environmental sensor for estimating a possible endangerment of the motor vehicle by an object present in the monitoring space and for delivering at least one result signal representative of the endangerment. The analysis unit is configured to judge on the basis of the detection signal whether an object present in the monitoring space is approaching a lane adjacent to the lane traveled by the motor vehicle and to signal the result of the judgment in a result signal.

According to a first embodiment, the environmental sensor can comprise a receiver for a signal, which is emitted from a foreign vehicle present in the observation space and indicates an imminent or occurring lane change of the foreign vehicle. Such a signal can be a radio signal, for example, which is emitted from the foreign vehicle when the driver of the foreign vehicle actuates a turn signal on the side of the foreign vehicle facing toward the adjacent lane, or it can be automatically generated by the foreign vehicle if a lane departure warning signal of the foreign vehicle registers an approach of the foreign vehicle on the adjacent lane or a beginning change to this lane. Alternatively or additionally, the receiver of the environmental sensor can also comprise an optical sensor which responds directly to the light of the turn signal of the foreign vehicle.

Furthermore, the environmental sensor can alternatively or additionally also comprise a transmitter which emits a scanning signal into the monitoring space and a receiver for receiving an echo of the scanning signal reflected from an object in the monitoring space. Such a transceiver arrangement allows the recognition of an approach of a foreign vehicle on the adjacent lane in particular if the foreign vehicle neither provides a radio signal nor indicates his lane change intention by actuating a turn signal.

Furthermore, the environmental sensor is expediently to be configured to detect a delimitation of the adjacent lane. If the environmental sensor comprises a camera for this purpose, this camera can also be used to detect a turn signal of a foreign vehicle as explained above.

Based on the detection of the lane delimitation, the analysis unit can compare the distance of the motor vehicle, measured transversely to the longitudinal direction of the motor vehicle, from the object to the distance of the motor vehicle from the delimitation and indicate in the result signal if the distance of the motor vehicle from the object decreases more rapidly than the distance of the motor vehicle from the delimitation. If this is the case, this indicates that the object or foreign vehicle is on the point of advancing onto the adjacent lane and therefore the danger of contact exists.

However, the detection of the lane delimitation can also be used for the purpose of automatically detecting the intention of the driver of the motor vehicle to change to the adjacent lane. As long as the motor vehicle does not approach the delimitation, there is no danger of a collision with a foreign vehicle possibly advancing on the adjacent lane, so that the driver also does not need to be irritated by a warning about the foreign vehicle. However, if the intention of the driver to change lanes may be recognized from the monitoring of the distance from the delimitation, then the judgment result is to be signaled, in order to possibly also notify the driver of an endangerment by the foreign vehicle.

In a similar way, the driver assistance device according to an embodiment can recognize the intention of the driver to change lanes as a function of whether or not he has set a turn signal in the direction of the monitoring space. If the turn signal is not set and also no other suggestion of a lane change intention of the driver is recognizable, the result of the judgment does not need to be signaled; however, if the turn signal is set, the result is to be signaled.

Estimating a speed component of the motor vehicle transversely to its longitudinal direction and displaying it in the result signal if the distance of the motor vehicle from the object measured transversely to the longitudinal direction decreases more rapidly than is to be expected on the basis of the estimated speed component comes into consideration as an alternative or supplementary approach for recognizing a possible endangerment. In this way, it can be decided without reference to a lane marking whether an approach between the motor vehicle and the object is caused solely by the movement of the motor vehicle, or whether an intrinsic movement of the object contributes thereto. In an embodiment, the speed component oriented transversely to the longitudinal direction of the motor vehicle can be estimated in particular on the basis of a steering angle set on the motor vehicle.

Furthermore, in another embodiment, the analysis unit is configured to derive the curvature of one of the lanes based on map data, which can be provided by a vehicle navigation system, for example. The analysis unit rectifies the estimated speed component by a curve-related fraction, taking into consideration in this manner that when the object detected in the monitoring space is a foreign vehicle, it will follow the curvature of its lane, even if it is not changing lanes.

The result signal is preferably used to activate a signal generator perceptible to the driver, which is preferably optical, acoustic, or haptic; under certain circumstances, it can also be used for an automatic engagement in the steering of the motor vehicle. Optic or acoustic signal generators are preferably each provided in pairs, each in spatial assignment to monitoring spaces on different sides of the motor vehicle. The haptic signal generator, for example, an actuator, uses a counterforce and opposes a steering movement of the driver toward the side of a monitoring space in which an endangerment was established.

In another embodiment, a method for assisting a driver of a motor vehicle is provided. The method includes monitoring a monitoring space located laterally to the motor vehicle for the presence of an object, judging whether an object present in the monitoring space is approaching a lane adjacent to a lane traveled by the motor vehicle, and signaling the result of the judgment in a detection signal.

In a further embodiment, a computer program product having program code means, which make a computer capable of operating as an analysis unit in a driver assistance device as described above or of executing the above-described method, is provided. Such a computer program product can be provided in a form stored on a computer-readable data carrier or also in a form not bound to a data carrier.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the application and uses contemplated herein. Furthermore, there is no intention to be bound by any theory presented in the preceding background or the following detailed description.

Figure 1:
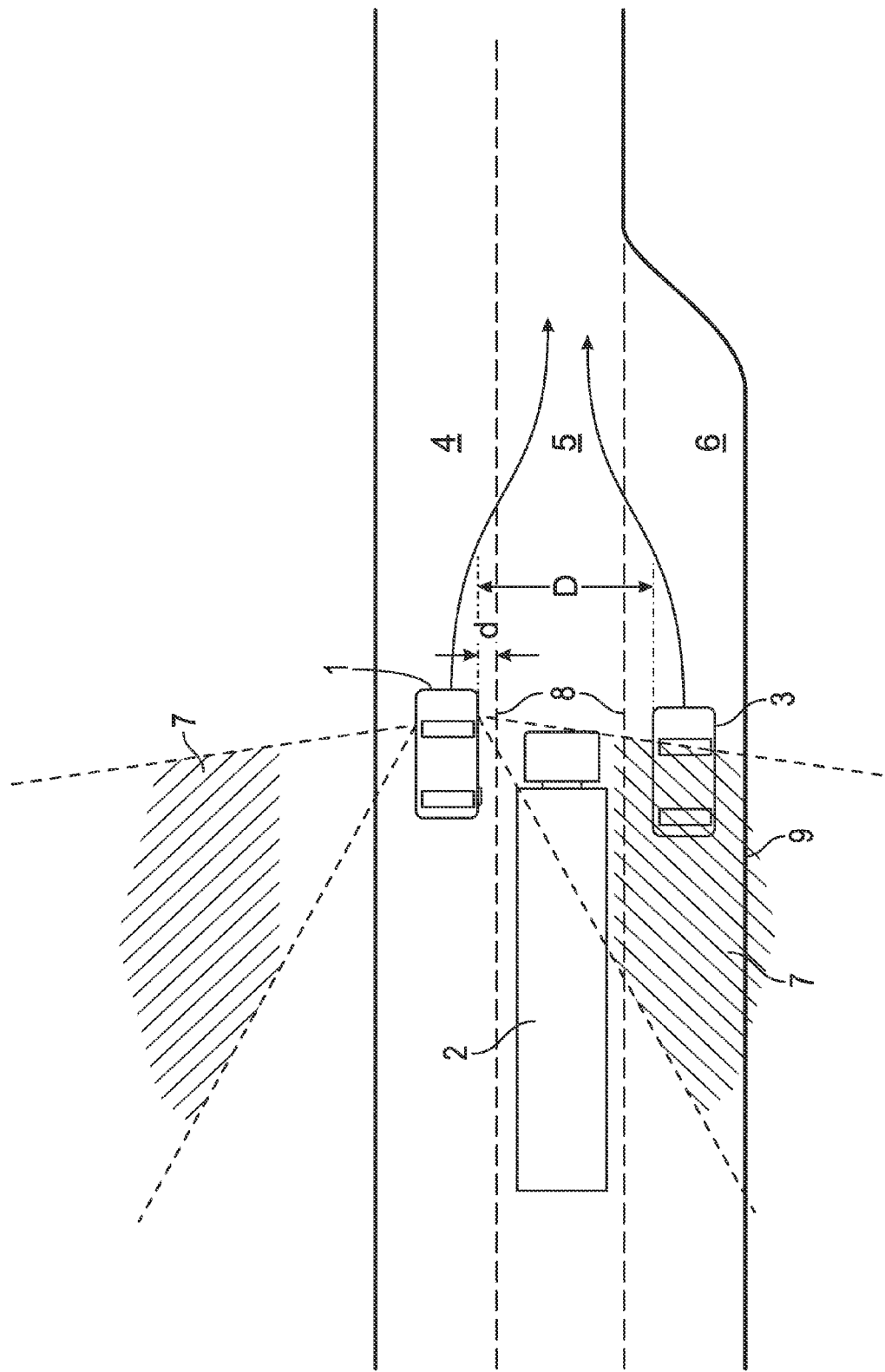
FIG. 1 illustrates a potentially hazardous situation in which two motor vehicles attempt to pass a truck.

Referring again to FIG. 1, the motor vehicle 1 is equipped with a driver assistance device according to an exemplary embodiment. Ambient sensors of the driver assistance device are arranged on both sides of the motor vehicle 1, for example, on its outside mirrors, to monitor monitoring spaces 7 on the left and right of the vehicle 1. The boundaries of each monitoring space 7 can be defined, e.g., if the ambient sensor is a camera or a receiver of other than optical rays, in particular radio waves, by the spatial angles from which the sensor can receive radiation. In FIG. 1, the boundaries of the monitoring spaces 7 are defined by dot-dash lines incident on one another at the location of the outside mirrors. In addition a restriction of the monitoring space to a predefined distance from the vehicle 1, as symbolized by shaded surfaces, can be performed based on triangulation or runtime measurements, for example.

In the traffic situation shown in FIG. 1, the right monitoring space 7 in relation to the travel direction of the motor vehicle 1 is completely blocked by the truck 2. The truck is too close to be detected as an object in the monitoring space 7 because it is located on the lane 5 directly adjacent to the lane 4 of the motor vehicle 1. Monitoring space 7 is essentially restricted to the lane 6 next to the closest lane—however, the truck prevents the detection of the foreign vehicle 3 actually located in the monitoring space 7. The path is free so that the driver assistance device of the motor vehicle 1 can perceive the foreign motor vehicle 3 only when the truck 2 has fallen back in relation to the vehicles 1, 3 farther than shown in the figure.

Figure 2:
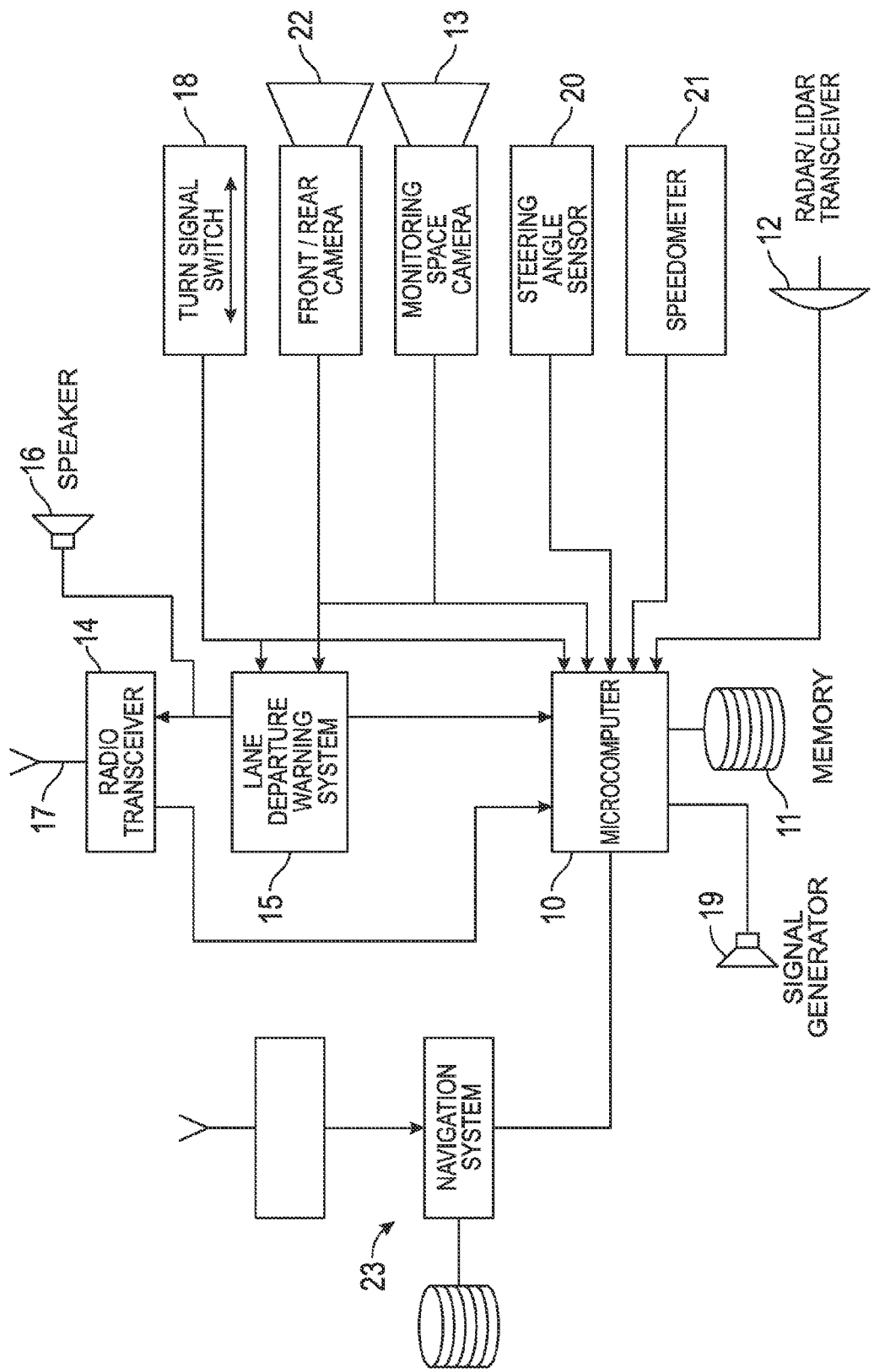
FIG. 2 is a block diagram of driver assistance devices using a method for assisting a driver of a motor vehicle when changing between lanes of a multilane road in accordance with an exemplary embodiment.

FIG. 2 shows a block diagram of an embodiment of the driver assistance device. Of the manifold components of this assistance device, all do contribute to the utility of the driver assistance device; however, many of them can be left out without putting the functionality of the driver assistance device into question.

The core component of the driver assistance device is a microcomputer 10. This microcomputer 10 can exclusively be used to implement the driver assistance device; however it can also be a microcomputer having a part of its computing capacity used for other control and monitoring tasks in the motor vehicle 1, which is made capable by a suitable program stored in its operating memory 11 of operating as an analysis unit in the scope of the driver assistance device. In particular, a computer readable medium of the microcomputer ma embodying a computer program product, the computer program product including a driver assistance program configured to assist a driver of a motor vehicle as contemplated herein.

The microcomputer 10 is connected in the illustration of FIG. 2 to a plurality of ambient or environmental sensors such as a radar or lidar transceiver 12, a camera 13, and a radio transceiver 14. Alternative embodiments can have one or two of these types of environmental sensors and also other types of environmental sensors Transceiver 12 and camera 13 are each provided in pairs, one for each monitoring space 7, on the vehicle 1. Because the monitoring of both monitoring spaces 7 functions identically, only one of these environmental sensors is discussed in each case in the following description.

The transceiver 12 emits a radio or light (in particular, infrared (IR)) scanning signal in the direction of the assigned monitoring space 7 and collects reflected echoes of this scanning signal. Through triangulation, runtime analysis, or the like, echoes of objects whose distance from the motor vehicle 1 transversely to its longitudinal direction is less than one or significantly more than two lanes can remain unconsidered, and the monitoring space 7 can thus be effectively restricted to the shaded area 7 in FIG. 1.

The camera 13 can also be positioned on one of the outside mirrors and can be aligned therefrom on the monitoring space 7. The estimation of the distance to a foreign vehicle 3 in the monitoring space 7 can be performed in that the microcomputer 10 recognizes the image of a foreign vehicle in the images delivered by the camera 13 and relates the size of the image to a reference. Of course, a stereoscopic camera can also be used as the camera 13, or signals of the camera 13 and of the transceiver 12 can be linked in the microcomputer 10 in order to arrive at a distance estimation.

Lane delimitation markings 8, 9, which mark the boundaries between the lanes 4, 5, 6 or the edge of the drivable surface, are also in the field of vision of the camera 13—if they are not concealed by foreign vehicles or other objects. The images of the camera 13 are therefore supplied to a lane departure warning system 15 known per se, which monitors on the basis of the figures the distance of the motor vehicle 1 to the closest-adjacent lane delimitation marking 8 and delivers a warning signal to a loudspeaker 16, in order to warn the driver of the vehicle 1 if this distance becomes critically small or the motor vehicle 1 traverses the marking 8. The lane departure warning system 15 is shown as a unit separate from the microcomputer 10 in FIG. 2, however, it is typically implemented in practice in the form of software on the microcomputer 10 itself, so that at least partially identical image processing routines can be used to identify lane delimitation markings 8 and foreign vehicles 3 in the images of the camera 13.

A warning signal generated by the lane departure warning system 15 is supplied not only to a loudspeaker 16, but rather also to a radio transceiver 14, in order to broadcast a corresponding warning to adjacent vehicles 2, 3. The radio transceiver 14 or other ambient sensors has a directional antenna 17. This can be used to broadcast the lane change warning message undirected or, preferably, only to broadcast it on the side of the lane which the vehicle 1 has critically approached. Vice versa, the directional antenna 17 is also used to receive corresponding lane change warning messages of other vehicles, the directional characteristic of the antenna 17 being able to be used here to restrict the reception of such warning messages to foreign vehicles in the monitoring space 7, i.e., to vehicles which are not well perceivable by the driver because they are located behind the motor vehicle 1.

A lane change warning message received from a foreign vehicle 3 in the monitoring space 7 is relayed from the radio transceiver 14 directly to the microcomputer 10. If the microcomputer 10 receives such a lane change warning message of a third vehicle from the transceiver 14 together with a warning signal of the lane departure warning system 15, this means that the motor vehicle 1 and the foreign vehicle 3 are simultaneously at the point of changing to the same lane 5, and therefore the danger of a collision exists. The microcomputer 10 reacts by activating a warning signal generator 19, e.g., a loudspeaker or an illuminated display, which is arranged in the passenger compartment of the motor vehicle 1 on the side of the lane 5 to which the motor vehicle 1 is at the point of changing. Alternatively or additionally, an actuator engaging on the steering wheel of the motor vehicle 1 can also be provided as the signal generator 19, which opposes a rotation of the steering wheel in the direction of the lane 5 with a counterforce clearly perceptible by the driver.

The microcomputer 10 and the lane departure warning system 15 are both connected to a turn signal switch 18, which the driver uses to set a turn signal on the motor vehicle body to visibly indicate his lane change intention for the drivers of other vehicles. If the signal of the turn signal switch 18 indicates that the turn signal is set on the side of the lane 5, this has the result that a critical approach of the motor vehicle 1 to the lane 5 detected by the lane departure warning system 15 is judged to be intended by the driver and does not result in the output of a warning signal via the loudspeaker 16. However, a corresponding warning message is nonetheless broadcast to the surrounding traffic via the radio transceiver 14. The microcomputer 10 reacts to the signal of the turn signal switch 18 precisely as to a lane change warning of the lane departure warning system 15. If a lane change warning of a foreign vehicle 3 received by the radio transceiver 14 is coincident with a signal of a turn signal switch 18 which indicates a turn signal set toward the side of the foreign vehicle 3, the microcomputer 10 then outputs the warning signal to the signal generator 19.

With the aid of the radio transceiver 14, only those foreign vehicles 3 are detected and taken into consideration which broadcast the same lane change warning messages as described above. In order to avoid a collision with the foreign vehicle 3 even if the latter does not broadcast lane change warning messages, it is necessary to estimate and monitor the distance between the motor vehicle 1 and the foreign vehicle 3 transversely to the longitudinal direction of the motor vehicle 1. For such an estimation, as already mentioned above, measuring signals of the transceiver 12 and/or the camera 13 can be analyzed by the microcomputer 10. Multiple analysis strategies can be used alternatively or cumulatively based on such a distance estimation.

A first such strategy is based on the other above-mentioned possibility of also monitoring the distance of the motor vehicle 1 from one of the lane delimitation markings 8 with the aid of the camera 13. If the distance D to the foreign vehicle 3 measured transversely to the longitudinal direction of the motor vehicle 1 decreases more rapidly than the distance d of the motor vehicle 1 from the marking 8, this means that the vehicles 1 and 3 are moving from different sides toward the lane 5 located between them. The danger of a collision exists, and the microcomputer 10 outputs the warning signal to the signal generator 19.

A second strategy requires the microcomputer 10 to also receive measuring data from a steering angle sensor 20 and a speedometer 21 of the vehicle 1. Based on the data of these two sensors 20, 21, the microcomputer 10 is capable of estimating a speed component of the vehicle 1 transversely to its longitudinal direction even without reference to an external reference object such as the lane delimitation marking 8. If the distance D to the foreign vehicle 3 decreases more rapidly than would be expected based on this lateral speed component, there is also a collision danger, and the microcomputer 10 delivers a warning signal to the signal generator 19.

In the simplest case, if the road on which the vehicles 1, 3 are moving extends straight ahead, then any nonzero steering wheel angle should have the result that the motor vehicle 1 approaches an adjacent lane at a lateral speed proportional to the steering wheel angle. Therefore, according to a simple embodiment, the rate $dD/dt$ at which the distance D to the foreign vehicle 3 should change, if it remains on its lane, can be assumed to be equal to the lateral speed.

However, this assumption does not apply if the roadway describes a curve. Both vehicles 1, 3 must follow this curve, so that in this case the microcomputer 10 does calculate a non-negligible lateral speed of the motor vehicle 1 from the measured values of the steering angle sensor 20 and the speedometer 21, but the distance D between the vehicles 1, 3 can nonetheless remain equal. In contrast, if both vehicles 1, 3 simultaneously move toward a lane located between them, the decrease |dD/dt| of the distance D can be less than the lateral speed of the motor vehicle 1. Therefore, when establishing which rate of change of the distance D is to be expected if the motor vehicle 1 changes its lane, but the foreign vehicle 3 maintains its lane, the radius of curvature of the lane must accordingly be taken into consideration when cornering. In order to be able to estimate this radius of curvature r, the camera 13 can be used if its field of vision is large enough; however, a further camera 22 oriented in the vehicle longitudinal direction is preferably provided for this purpose. In that this camera 22 records images of the parts of the lane 4 located in front of or behind the motor vehicle 1, the microcomputer 10 can estimate on the basis of the course of the lane delimitation markings 8 visible in these images the radius of curvature r of the lane 4 and calculate the lateral speed which the motor vehicle 1 must have so that it does not change its distance from the edges of the lane 4 traveled thereby in the course of its movement. The difference between this speed and the lateral speed calculated on the basis of the data of the steering angle sensor 20 and the speedometer 21 is the speed at which the distance D should decrease if the foreign vehicle 3 does not change its lane. If the decrease of the distance D is significantly more rapid, this means that both vehicles 1, 3 are moving toward the same lane and a danger of collision exists.

To determine the radius of curvature r of the lanes, instead of camera images as described above, in another embodiment, data on the course of the road traveled by the motor vehicle 1 can also be used, which are provided by a vehicle navigation system 23 known per se. These data can be coordinates of the currently traveled road, for example, on the basis of which the microcomputer 10 calculates the radius of curvature of the road at the location of the motor vehicle 1, or the navigation system 23 can be configured to deliver such radii of curvature directly to the microcomputer 10.

The calculation of an expected rate of change of the distance D based on this radius of curvature r can be performed in the same way as described above for the radius of curvature r estimated from the camera image data.

The navigation system 23 can have a further utility for the driver assistance device according to an embodiment if it not only delivers data about the course of the traveled road to the microcomputer 10, but rather also about the locations at which lanes of this road end. Foreign vehicles which are underway on such a lane must leave it before its end and are forced to change to an adjacent lane. The microcomputer 10 can use specifications of the navigation system 23 about the imminent end, e.g., of the lane 6 of FIG. 1, in that a warning signal is already output to the signal generator 19 in the traffic situation shown in FIG. 1 to stop the driver of the motor vehicle 1 from a possible change to the lane 5, although (or particularly because) the truck 2 prevents the assistance device from detecting possible foreign vehicles on the entry 6.

In another embodiment, decision thresholds which must be exceeded as a requirement for outputting a warning signal to the signal generator 19 are reduced sometime before the end of the lane 6 to temporarily increase the readiness of the device to assume merging of a foreign vehicle from the lane 6 onto the lane 5.

In a further embodiment, within a predefined distance before the end of the lane 6, the microcomputer assumes the intention to change to the lane 5 of every foreign vehicle moving on this lane, even if no movement of the foreign vehicle 3 transversely to its lane yet indicates this. In other words, at a predefined distance before the end of the lane 6, merely the presence of a foreign vehicle 3 on this lane is sufficient so that the microcomputer 10 delivers a warning signal to the signal generator 19.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A driver assistance device for a motor vehicle, the driver assistance device comprising:
    an environmental sensor configured to monitor a monitoring space located laterally to the motor vehicle for the presence of a second vehicle and is further configured to detect a delimitation of the lane adjacent to the lane traveled by the motor vehicle, wherein the environmental sensor comprises a receiver configured to receive a signal emitted by the second vehicle; and
    an analysis unit configured to receive a detection signal from the environmental sensor, wherein based on the detection signal the analysis unit is further configured to determine whether the second vehicle present in the monitoring space is approaching a lane adjacent to a lane traveled by the motor vehicle, and to generate a signal based thereon indicating when a distance of the motor vehicle from the second vehicle measured transversely to a longitudinal direction of the motor vehicle decreases more rapidly than a distance of the motor vehicle from the delimitation.

2. The driver assistance device according to claim 1, wherein the environmental sensor comprises a transmitter configured to emit a scanning signal into the monitoring space and a receiver configured to receive an echo of the scanning signal reflected from the object in the monitoring space.

3. The driver assistance device according to claim 1, wherein the analysis unit is configured to signal or not signal as a function of whether the motor vehicle does or does not approach the delimitation, respectively.

4. The driver assistance device according to claim 1, wherein the analysis unit is configured to signal or not to signal as a function of whether a turn signal is set or is not set in a direction of the monitoring space.

5. The driver assistance device according to claim 1, wherein the analysis unit is configured to estimate a speed component of the motor vehicle transverse to a longitudinal direction and to indicate when a distance of the motor vehicle from the second vehicle measured transversely to the longitudinal direction of the motor vehicle decreases more rapidly than is to be expected on a basis of the speed component.

6. The driver assistance device according to claim 5, wherein the analysis unit is configured to estimate the speed component on a basis of a steering angle set on the motor vehicle.

7. The driver assistance device according to claim 5, wherein the analysis unit is configured to derive a curvature of one of the lane traveled by the motor vehicle or the lane adjacent thereto on a basis of map data and to rectify the speed component by a curvature-related fraction.

8. The driver assistance device according to claim 1, wherein the analysis unit is configured to recognize an imminent end of the lane traveled by the motor vehicle or the lane adjacent thereto.

9. The driver assistance device according to claim 8, wherein the analysis unit is configured to indicate whether at least one of the second vehicle is located in the monitoring space and an obstruction blocks the monitoring of the monitoring space.

10. The driver assistance device according to claim 1, wherein at least one of an optic, acoustic, and haptic signal generator is activated by the signal.

11. A method for assisting a driver of a motor vehicle, the method comprising the steps of:
- electronically monitoring a monitoring space located laterally of the motor vehicle for electromagnetic radiation indicating the presence of a second vehicle or an object;
- receiving a signal that is emitted by the second vehicle present in the monitoring space and that indicates an imminent or occurring lane change of the second vehicle;
- determining from the electromagnetic radiation whether the second vehicle present in the monitoring space is approaching a lane adjacent to a lane traveled by the motor vehicle;
- estimating a speed component of the motor vehicle transverse to a longitudinal direction;
- derive a curvature of one of the lane traveled by the motor vehicle and the lane adjacent thereto on a basis of map data and to rectify the speed component by a curvature-related fraction; and
- signaling results of the determination in a detection signal perceptible by the driver.

12. The method according to claim 11, further comprising emitting a scanning signal into the monitoring space and receiving an echo of the scanning signal reflected from the object in the monitoring space.

13. The method of claim 11, further comprising detecting a delimitation of the lane adjacent to the lane traveled by the motor vehicle.

14. A non-transitory computer readable medium embodying a computer program product, the computer program product comprising a driver assistance program configured to:
- monitor a monitoring space located laterally of the motor vehicle for a presence of a second vehicle;
- receive a signal that is emitted by the second vehicle present in the monitoring space and that indicates an imminent or occurring lane change of the second vehicle;
- determine whether the second vehicle present in the monitoring space is approaching a lane adjacent to a lane traveled by the motor vehicle; and
- signal when the second vehicle is present in the monitoring space and is approaching the lane adjacent to the lane traveled by the motor vehicle with a detection signal if a distance of the motor vehicle from the second vehicle measured transversely to a longitudinal direction of the motor vehicle decreases more rapidly than a distance of the motor vehicle from a delimitation of the lane adjacent to a lane traveled by the motor vehicle.

15. The computer readable medium of claim 14, wherein the driver assistance program is further configured to emit a scanning signal into the monitoring space and receive an echo of the scanning signal reflected from the object in the monitoring space.

* * * * *